April 29, 1930.　　　　　F. C. FRARY　　　　　1,756,425
CALCINED BAUXITE AND METHOD OF PRODUCING SAME
Filed June 19, 1925
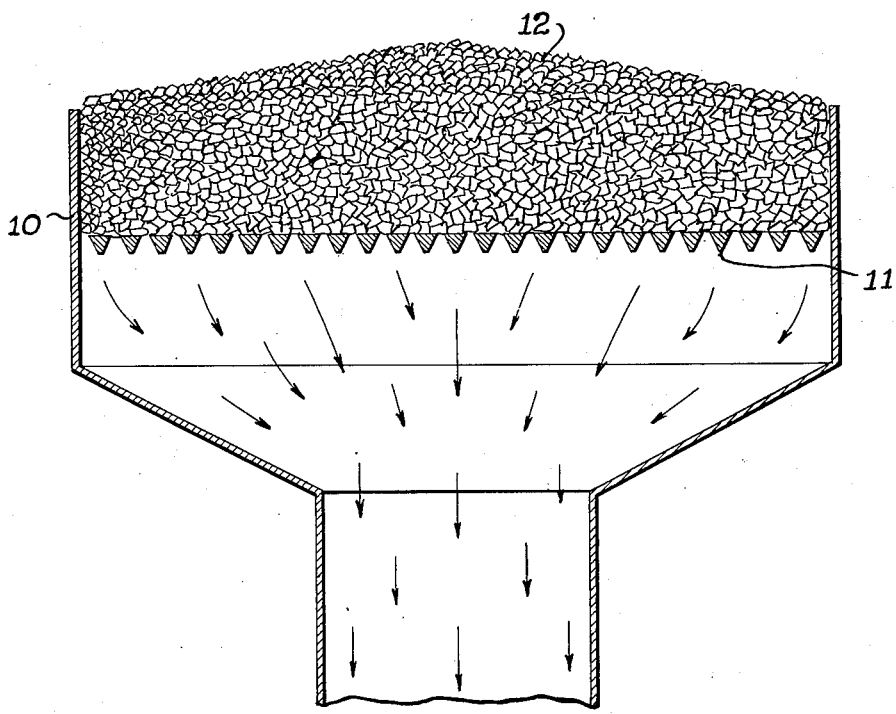
Inventor
Francis C. Frary.
By his Attorneys
Cooper, Kerr & Dunham Patented Apr. 29, 1930

1,756,425

UNITED STATES PATENT OFFICE

FRANCIS C. FRARY, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA

CALCINED BAUXITE AND METHOD OF PRODUCING SAME.

Application filed June 19, 1925. Serial No. 38,284.

In various arts in which bauxite or other aluminous material is employed, as for example in the manufacture of aluminous abrasives in the electric furnace, in the production of pure alumina (for making metallic aluminum) by electrothermal reduction of impurities, and in the manufacture of alumina cement, it has been found economically necessary, and desirable for other reasons, to calcine the bauxite before introducing it into the furnace. Not only does the use of uncalcined bauxite increase decidedly the power consumption because of the heat absorbed in evaporating the water, but the introduction of the uncalcined material into the hot furnace causes a rapid and violent evolution of water vapor which often throws molten alumina out of the furnace, sometimes resulting in severe injury to workmen.

Heretofore it has been customary to calcine the bauxite in a rotary kiln, usually at the mine. Calcination of bauxite in that type of apparatus, however, to such an extent that the product will not take up more than a fraction of a per cent of water in subsequent shipment, requires about half a ton of coal to each ton of calcined bauxite, thus making the process costly. Another serious disadvantage resides in the disintegration of the bauxite lumps during the calcination, causing the material to be largely reduced to a coarse powder, which, when charged into the reducing furnace, packs into a mass and does not permit free passage of the furnace gases. This often causes accumulation of gases below or within the mass until sufficient pressure is developed to force a path upward through the charge, which results in a shower of hot charge being thrown in every direction. Moreover the resultant channeling of the furnace contents, confining the escape of gases to a few spots, not only increases the loss in dust and fume but also increases the power consumption since the escaping gases have less opportunity to give up their heat to the descending charge and therefore carry more of the heat away with them. Also, the jets of inflamed escaping carbon monoxide often impinge at high velocity upon the furnace electrodes or electrode holders, and cause injury thereto by overheating.

Need has therefore been felt for a method of calcining bauxite which would obviate or at least markedly decrease the disadvantages outlined above, and in the course of my study and experimentation with a view to devising such a method I found that these difficulties could be practically entirely avoided by calcining the bauxite, in admixture with clay, iron ore, or other suitable material, if necessary, at a temperature high enough to cause incipient fusion of some, at least, of the material referred to while maintaining the mass substantially undisturbed, and then allowing the mass to cool. The calcined product is found to be clinkered and in a coarsely porous or spongy condition resembling "sinter", and has sufficient mechanical strength to withstand handling and transportation. At the same time its spongy or porous structure facilitates the passage of furnace gases through the whole mass of the charge in the subsequent electrothermal treatment for removal of the associated impurities.

In the preferred mode of carrying out the process for making my product the bauxite is first crushed so that it will all pass through a half-inch screen, or about that size. It is then mixed with about ten per cent (more or less) of coke breeze or other suitable fuel and enough water to moisten the mixture and cause the powdery portions thereof to stick to the lumps. If the proportion of fusible material naturally present in the bauxite, as for example ferric oxide, is not sufficient to cause the desired agglomeration, the needed addition of iron ore, clay, or the like, can be made to the mixture, preferably before wetting the same.

The mixture thus prepared is spread on a suitable grate and the fuel is ignited and caused to burn rapidly, as by means of forced draft produced by suction downward through the grate and the superimposed material. The extent of the resulting fusion of the material depends largely upon the proportions of its ingredients—fuel, water, and bauxite (including added material)—and the speed of the combustion; more fuel or greater draft producing a higher temperature and more extensive sintering. In the cooling which follows the heating, the partially fused clay or iron oxides (or both) solidify and bond the unfused lumps together in the coarsely porous mass of clinker described above.

The process outlined is illustrated in the accompanying drawing, which shows diagrammatically in cross section a body of bauxite and fuel undergoing the described clinkering.

In the drawing, 10 represents a receptacle, pan, or other suitable structure having a grate 11 on which rests the charge 12, of suitable thickness, say four to nine inches. The fuel is ignited at the upper surface. A suction fan or other convenient means, not shown, may be used to create the necessary downdraft, indicated by the arrows. The combustion progresses downwardly and as the fuel is consumed the air entering the material from above cools and thus solidifies the fused bonding agent.

Instead of coke breeze I may use any other suitable fuel, for example anthracite fines, or a mixture of such fuels.

By the process described I have treated with complete success bauxite containing (on a dry basis) about 50 per cent of aluminum oxide, 23 per cent ferric oxide, 4 per cent silica and 3 per cent titanium oxide, the remainder (about 20 per cent) being chiefly combined water. This is fairly representative of the composition of bauxites found in the Mediterranean region. As before stated, if the naturally occurring bauxite does not contain enough impurities to produce a good clinker or "sinter" I can add to it the needed amount of such substances, say iron ore, or clay, or both.

In comparison with the rotary kiln method my process is not only more economical (requiring only about one-fifth as much fuel, ordinarily) but also produces a product which is in every way more suitable for electrothermal reduction or other purification treatment at high temperatures or for making alumina cement. The calcination is so thorough that practically no water is taken up on standing. By passing the masses of clinker over a screen any small portion of the fines that did not get completely agglomerated with the rest of the material can be separated for retreatment, thereby reducing the dust loss to practically nothing.

In accordance with the requirements of the patent statutes I have so described my novel product, the manner and process of making it, and a use of it, as to enable any person skilled in the art to which it appertains to practice and use my invention. I have also stated what I believe to be the correct theory and scientific principles underlying my invention. Thus, for example, I have stated that in the cooling which follows the heating, the partially fused iron oxides solidify and bond the unfused lumps together. It has been suggested, after my invention was made by me and disclosed by me, that in a process such as mine as above disclosed, the iron oxides combine with adjacent molecules of aluminum oxide, forming iron aluminates which are more fusible than the remaining aluminum oxide and which, under the influence of the current of air, are caused to surround or cement together the particles of aluminum oxide which are then quickly cooled, and, further, that these aluminum oxide particles are converted by the heat into particles having a density much greater than that of the original bauxite. Having met the statutory requirements as to disclosure of my invention in my application as filed, I do not desire to be bound by any statement of the scientific principles involved or to enter into speculation.

What I claim is—

1. Process of calcining bauxite, comprising crushing the bauxite, and by the substantially complete combustion of carbonaceous fuel mixed therewith heating the bauxite and by such heating driving off free and combined water and without substantial reduction of non-aluminous material fritting the pieces of bauxite together to a coherent coarsely porous mass substantially free from carbon.

2. Process of calcining bauxite, comprising crushing the bauxite, mixing carbonaceous fuel therewith, burning substantially all the fuel, and by the heat of such combustion without substantial reduction of non-aluminous material fritting the mass to a coherent coarsely porous form substantially free from unburned fuel.

3. Process of calcining bauxite, comprising crushing the bauxite, mixing the bauxite with fuel and by wetting causing adherence of fine particles of the mixture together and to the larger pieces, and burning the fuel rapidly and substantially completely to produce in the mixture heat insufficient for substantial reduction of non-aluminous material but sufficient to agglomerate the mass to a coherent, coarsely porous form by fusion of its more readily fusible constituents.

4. Process of calcining bauxite, comprising mixing bauxite, iron oxide, and a suitable fuel, and burning the fuel rapidly and substantially completely to fuse more or less of the iron oxide and without substantial reduction of such oxide agglomerate the mass into a coherent coarsely porous form.

5. As a new product, a coherent, coarsely porous body substantially free from carbon composed essentially of lumps of calcined bauxite fritted together by non-aluminous material and containing substantially the same amount of non-aluminous oxides as was present before calcination.

6. As a new product, a coherent, coarsely porous body substantially free from carbon composed essentially of calcined bauxite in the form of lumps agglomerated by non-aluminous oxide and containing substantially the same amount of non-aluminous oxides as was present before calcination.

7. As a new product, a coherent, coarsely porous body substantially free from carbon composed essentially of calcined bauxite in the form of agglomerated lumps, and containing substantially the same amount of non-aluminous oxides as was present before calcination, the agglomerating material being chiefly iron oxide.

8. The process of calcining bauxite, comprising mixing bauxite with combustible material and supplying any deficiency of bond-forming ingredient, and progressively heating and cooling the mixture by transitory combustion of the intermingled combustible material under draught at such rate as to cause by the heat the production of a bonding agent which is solidified by the cooling and binds together particles of alumina in a clinkered porous structure.

9. As a product, calcined bauxite in a clinkered coarsely porous condition, of such mechanical strength as to withstand handling and transportation without substantial disintegration, and substantially free of combustible material.

10. As a product, calcined bauxite in a clinkered coarsely porous condition, of such mechanical strength as to withstand handling and transportation without substantial disintegration, and substantially free of combustible material, and substantially free from and non-absorbent to water.

In testimony whereof I hereto affix my signature.

FRANCIS C. FRARY.